(12) United States Patent
Edsall et al.

(10) Patent No.: US 7,599,360 B2
(45) Date of Patent: Oct. 6, 2009

(54) METHODS AND APPARATUS FOR ENCAPSULATING A FRAME FOR TRANSMISSION IN A STORAGE AREA NETWORK

(75) Inventors: Thomas James Edsall, Cupertino, CA (US); Dinesh Ganapathy Dutt, Sunnyvale, CA (US); Silvano Gai, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 767 days.

(21) Appl. No.: 10/034,160

(22) Filed: Dec. 26, 2001

(65) Prior Publication Data

US 2003/0118053 A1    Jun. 26, 2003

(51) Int. Cl.
H04L 12/28 (2006.01)
(52) U.S. Cl. .................................. 370/389; 370/395.53
(58) Field of Classification Search .................. 370/389, 370/392, 393, 386, 395.53, 399, 397, 395.5, 370/400, 396, 395.2, 395.3, 395.31, 395.42, 370/411, 475, 466, 395.41, 395.52
See application file for complete search history.

(56) References Cited

U.S. PATENT DOCUMENTS

| | | |
|---|---|---|
| 5,428,471 A | 6/1995 | McDermott |
| 5,506,838 A | 4/1996 | Flanagan |
| 5,617,421 A | 4/1997 | Chin et al. |
| 5,675,741 A | 10/1997 | Aggarwal et al. |
| 5,682,479 A | 10/1997 | Newhall et al. |
| 5,708,659 A | 1/1998 | Rostoker et al. |
| 5,740,159 A | 4/1998 | Ahmad et al. |
| 5,740,171 A | 4/1998 | Mazzola et al. |
| 5,742,604 A | 4/1998 | Edsall et al. |
| 5,764,636 A | 6/1998 | Edsall |

(Continued)

FOREIGN PATENT DOCUMENTS

EP    0772121 A    5/1997

(Continued)

OTHER PUBLICATIONS

PCT International Search Report, PCT/US02/41072, mailed May 23, 2003, 5 pages.

(Continued)

Primary Examiner—Brenda Pham
(74) Attorney, Agent, or Firm—Weaver Austin Villeneuve & Sampson LLP

(57) ABSTRACT

Methods and apparatus for encapsulating a packet or frame for transmission in a storage area network are disclosed. A packet or frame compatible with a standard protocol employed in the storage area network is received or generated. The packet or frame is then encapsulated with a virtual storage area network identifier. The packet or frame may further be encapsulated with at least one of a TTL value, MPLS information, and a type of traffic to be carried by the packet or frame. For instance, the type of traffic to be carried by the packet or frame may include Ethernet, Fibre Channel, and Infiniband. Once encapsulated, the encapsulated packet or frame is sent over the storage area network. For instance, the encapsulated packet or frame may be generated as well as transmitted by a switch over an inter-switch link in the storage area network.

58 Claims, 4 Drawing Sheets

U.S. PATENT DOCUMENTS

| | | | |
|---|---|---|---|
| 5,809,285 | A | 9/1998 | Hilland |
| 5,818,603 | A | 10/1998 | Motoyama |
| 5,819,112 | A | 10/1998 | Kusters |
| 5,862,125 | A | 1/1999 | Russ |
| 5,959,972 | A | 9/1999 | Hamami |
| 5,959,990 | A * | 9/1999 | Frantz et al. ............... 370/392 |
| 5,964,841 | A | 10/1999 | Rekhter |
| 5,999,930 | A | 12/1999 | Wolff |
| 6,035,105 | A | 3/2000 | McCloghrie et al. |
| 6,046,985 | A | 4/2000 | Aldred |
| 6,101,497 | A | 8/2000 | Ofek |
| 6,160,813 | A | 12/2000 | Banks et al. |
| 6,188,668 | B1 | 2/2001 | Brewer et al. |
| 6,188,694 | B1 | 2/2001 | Fine et al. |
| 6,202,135 | B1 | 3/2001 | Kedem et al. |
| 6,205,488 | B1 | 3/2001 | Casey et al. ............... 709/238 |
| 6,208,623 | B1 | 3/2001 | Rochberger et al. |
| 6,208,649 | B1 | 3/2001 | Kloth |
| 6,209,059 | B1 | 3/2001 | Ofer et al. |
| 6,219,699 | B1 | 4/2001 | McCloghrie et al. |
| 6,226,771 | B1 | 5/2001 | Hilla et al. |
| 6,260,120 | B1 | 7/2001 | Blumenau et al. |
| 6,262,977 | B1 | 7/2001 | Seaman et al. |
| 6,266,705 | B1 | 7/2001 | Ullum et al. |
| 6,269,381 | B1 | 7/2001 | St. Pierre et al. |
| 6,269,431 | B1 | 7/2001 | Dunham |
| 6,295,296 | B1 * | 9/2001 | Tappan ............... 370/392 |
| 6,295,575 | B1 | 9/2001 | Blumenau et al. |
| 6,330,614 | B1 * | 12/2001 | Aggarwal et al. ........... 709/236 |
| 6,337,861 | B1 * | 1/2002 | Rosen ............... 370/389 |
| 6,388,995 | B1 | 5/2002 | Gai et al. |
| 6,408,001 | B1 * | 6/2002 | Chuah et al. ............... 370/392 |
| 6,426,952 | B1 | 7/2002 | Francis et al. |
| 6,438,612 | B1 | 8/2002 | Ylonen et al. |
| 6,473,421 | B1 | 10/2002 | Tappan |
| 6,493,349 | B1 | 12/2002 | Casey |
| 6,529,963 | B1 | 3/2003 | Fredin et al. |
| 6,532,212 | B1 | 3/2003 | Soloway et al. |
| 6,597,663 | B1 | 7/2003 | Rekhter |
| 6,604,407 | B2 | 8/2003 | Kano |
| 6,643,287 | B1 * | 11/2003 | Callon et al. ............... 370/392 |
| 6,661,773 | B1 | 12/2003 | Pelissier et al. |
| 6,674,760 | B1 * | 1/2004 | Walrand et al. ............ 370/411 |
| 6,728,220 | B2 * | 4/2004 | Behzadi ............... 370/254 |
| 6,728,848 | B2 * | 4/2004 | Tamura et al. ............... 711/162 |
| 6,775,230 | B1 | 8/2004 | Watanabe et al. |
| 6,804,776 | B1 | 10/2004 | Lothberg et al. |
| 6,848,007 | B1 | 1/2005 | Reynolds et al. |
| 6,859,435 | B1 | 2/2005 | Lee et al. |
| 6,879,560 | B1 | 4/2005 | Cahn |
| 6,904,053 | B1 | 6/2005 | Berman |
| 6,915,358 | B2 | 7/2005 | Horton et al. |
| 6,920,133 | B1 * | 7/2005 | Boodaghians ............... 370/389 |
| 6,920,153 | B2 * | 7/2005 | Ellis et al. ............... 370/475 |
| 6,920,154 | B1 | 7/2005 | Achler |
| 6,947,379 | B1 | 9/2005 | Gleichauf et al. |
| 6,959,151 | B1 | 10/2005 | Cotter et al. |
| 6,975,589 | B2 | 12/2005 | Luft et al. |
| 6,985,490 | B2 | 1/2006 | Czeiger et al. |
| 7,006,525 | B1 | 2/2006 | Jha |
| 7,026,288 | B2 | 4/2006 | Judice et al. |
| 7,027,406 | B1 | 4/2006 | Shabtay et al. |
| 7,046,679 | B2 | 5/2006 | Sampath |
| 7,050,392 | B2 | 5/2006 | Valdevit |
| 7,054,304 | B2 | 5/2006 | Wang |
| 7,061,858 | B1 | 6/2006 | Di Benedetto et al. |
| 7,072,298 | B2 | 7/2006 | Paul et al. |
| 7,079,544 | B2 | 7/2006 | Wakayama et al. |
| 7,082,140 | B1 | 7/2006 | Hass |
| 7,085,846 | B2 | 8/2006 | Jenne et al. |
| 7,155,494 | B2 | 12/2006 | Czeiger et al. |
| 7,161,935 | B2 | 1/2007 | Alonso et al. |
| 7,206,288 | B2 | 4/2007 | Cometto et al. |
| 7,216,158 | B2 | 5/2007 | Revanuru et al. |
| 7,221,652 | B1 | 5/2007 | Singh et al. |
| 7,275,103 | B1 | 9/2007 | Thrasher et al. |
| 7,302,494 | B2 | 11/2007 | Hayashi et al. |
| 7,319,669 | B1 | 1/2008 | Kunz et al. |
| 7,328,260 | B1 | 2/2008 | Muthiyan et al. |
| 7,355,983 | B2 | 4/2008 | Scudder et al. |
| 7,376,755 | B2 | 5/2008 | Pandya |
| 2001/0049739 | A1 * | 12/2001 | Wakayama et al. ......... 709/230 |
| 2002/0009081 | A1 | 1/2002 | Sampath et al. |
| 2002/0101868 | A1 * | 8/2002 | Clear et al. ............... 370/389 |
| 2002/0110125 | A1 | 8/2002 | Banks et al. |
| 2002/0150039 | A1 | 10/2002 | Valdevit et al. |
| 2002/0152338 | A1 | 10/2002 | Elliott et al. |
| 2002/0156918 | A1 | 10/2002 | Valdevit et al. |
| 2002/0156924 | A1 | 10/2002 | Czeiger et al. |
| 2002/0176434 | A1 | 11/2002 | Yu et al. |
| 2002/0188754 | A1 | 12/2002 | Foster et al. |
| 2003/0012204 | A1 | 1/2003 | Czeiger et al. |
| 2003/0016624 | A1 | 1/2003 | Bare |
| 2003/0101239 | A1 * | 5/2003 | Ishizaki ............... 709/219 |
| 2003/0107987 | A1 | 6/2003 | Kinstler |
| 2003/0118053 | A1 | 6/2003 | Edsall et al. |
| 2003/0145116 | A1 | 7/2003 | Moroney et al. |
| 2003/0149848 | A1 | 8/2003 | Ibrahim et al. |
| 2003/0163727 | A1 | 8/2003 | Hammons et al. |
| 2003/0189929 | A1 | 10/2003 | Matsuzaki et al. |
| 2004/0100910 | A1 | 5/2004 | Desai et al. |
| 2004/0151174 | A1 | 8/2004 | Del Signore et al. |
| 2004/0151188 | A1 | 8/2004 | Maveli et al. |
| 2004/0230787 | A1 | 11/2004 | Blumenau et al. |
| 2004/0233921 | A1 | 11/2004 | Krieg et al. |
| 2005/0018701 | A1 | 1/2005 | Dropps |
| 2005/0036499 | A1 | 2/2005 | Dutt et al. |
| 2005/0080903 | A1 | 4/2005 | Valenci |
| 2005/0108444 | A1 | 5/2005 | Flauaus |
| 2005/0117562 | A1 | 6/2005 | Wrenn |
| 2005/0267965 | A1 | 12/2005 | Heller |
| 2006/0034302 | A1 | 2/2006 | Peterson |
| 2006/0038263 | A1 | 2/2006 | Eigner et al. |
| 2006/0087963 | A1 | 4/2006 | Jain et al. |
| 2006/0092932 | A1 | 5/2006 | Ghosh et al. |
| 2006/0153186 | A1 | 7/2006 | Bector |
| 2006/0159081 | A1 | 7/2006 | Dropps |
| 2008/0028096 | A1 | 1/2008 | Henderson et al. |

FOREIGN PATENT DOCUMENTS

| | | |
|---|---|---|
| EP | 1134938 | 9/2001 |
| EP | 1187406 | 3/2002 |
| JP | 2-209044 | 8/1990 |
| JP | 10-293633 | 11/1998 |
| JP | 2000-22699 | 2/2000 |
| JP | 2001-154929 | 6/2001 |
| JP | 2001-320420 | 11/2001 |
| JP | 2001-345865 | 12/2001 |
| WO | WO 00/31925 | 6/2000 |
| WO | WO 01/19027 | 3/2001 |
| WO | WO 01/95565 | 12/2001 |

OTHER PUBLICATIONS

Armitage, Grenville, "MPLS: The Magic Behind the Myths," Jan. 2000, *IEEE Communications Magazine*, pp. 124-131.

Listanti et al., "Architectural and Technological Issues for Future Optical Internet Networks", IEEE Communication Magazine, Sep. 2000.

EPO Search report dated May 19, 2005, Application No. 03 746062.3 -1249.

U.S. Appl. No. 10/170,855, office action dated May 22, 2006.

K. White, IBM Corp, RFC 2925, Sep. 2000.

Cisco Systems, Inc. (1992-2003), "Cisco MDS 9000 Family of Multilayer Directors and Fabric Switchers," pp. 1-4.
Cisco Systems, Inc. (1992-2003), "Cisco SAN-OS," pp. 1-7.
Cisco Systems, Inc. (1992-2004), "Cisco SAN-OS Reference Guide," pp. 1-13.
Cometto et al. (Apr. 1, 2002), "Methods and Apparatus for Fibre Channel Frame Delivery," U.S. Appl. No. 10/114,568.
Cometto et al., Allowed Claims for U.S. Appl. No. 10/170,855.
Cometto et al., Notice of Allowance for U.S. Appl. No. 10/170,855.
Desanti (Oct. 2004), "Extended_Headers," VF N_Port Model T11/04-627v1, 1 page.
Desanti (Oct. 2004), "Virtual Fabrics N_Port Support," VF N_Support. T11/04-949v2, 14 pages.
Desanti (Oct. 2004), "Virtual Fabrics Switch Support", VF Switch Support, T11/04-395v3, 15 pages.
Desanti (Apr. 2003), "Virtual Fabrics," T11/03-220v0, 11 pages (Microsoft PowerPoint presentation).
Desanti (Jul. 2004), "Virtual Fabrics N_Port Support," VF N_Support, T11/04-49v0, 13 pages.
Desanti et al. (May 2003), "Tagged Frame Specification," Tagged Frame Spec., T11/03-353v0, 4 pages.
Guan et al. (May 30, 2003), "Inter-fabric FC Architecture," Brocade—The Intelligent Platform for Network Storage.
Lee et al. (4/12002). "Label Switching in Fibre Channel Networks," U.S. Appl. No. 10/114,394.
Listanti et al. (Sep. 2000), "Architectural and Technological Issues for Future Optical Internet Networks," Optical Solutions for Next-Generation Internet Networks, IEEE Communication Magazine.
Mearian et al., "What's After Fibre Channel?," ComputerWorld (webprint), XP002246206.
Mills (Jul. 1988), "Network Working Group Request for Comments 1059, Network Time Protocol (Version 1) Specification and Implementation," University of Delaware, pp. 1-50.
Monia (Dec. 12, 2000), "iFCP—A Protocol for Internet Fibre Channel Storage Networking" Nishan Systems (webprint), P002246205.
Monia et al. (Feb. 2002), "iFCP—A Protocol for Internet Fibre Channel Storage Networking."
NCITS (Nov. 28, 2000), "Fibre Channel Generic Services-3 (FC-GS-3)," working draft.
NCITS (Feb. 19, 2003), "Fibre Channel Switch Fabric-3 (FC-SW-3)," working draft (XP002300830 (A,B,C)).
NCITS (Jun. 26, 2001), "Fibre Channel Switch Fabric-2 (FC-SW-2)." working draft.
Rajagopal et al. (Jun. 30, 1999), "IP and ARP Over Fibre Channel," Request for Comments: 2625 (webprint), XP002246207.
Rangan (Sep. 4, 2001), "Re: FCIP/1FCP: Gurantee In-Order delivery for FC N/NL_ports," IP Storage—Mailing List Archive (http://www.pdl.cmu/edu/mailinglists/ips/mail/msg03069.html webprint).
Rosen et al. (Jan. 2001), "Multiprotocol Label Switching Architecture," Network Working Group, RFC 3031, XP002251364.
Valdevit (May 23, 2000), "Fabric Shortest Past First Version (FSPF) Rv. 0.2", Fabric Shortest Path (http://t11.org/index.htm webprint), XP002959525.
White (Sep. 2000), RFC 2925, IBM Corp.
Fabric Shortest Path First (FSPF) Project 1508-D Switch Fabric -3 Rev. 6.5, (http://t11/org/index.htm webprint), pp. 117-140 (Oct. 31, 2003).
AU Office Action (Mar. 16, 2007) from AU Patent Application No. 2002364204.
AU Office Action (May 23, 2007) from AU Patent Application No. 2003226093.
AU Office Action dated May 30, 2007 from AU Patent Application No. 2003226022.
CN Office Action (Sep. 8, 2006) from CN Patent Application No. 03807600.4.
EP Office Action (Mar. 28, 2007) from EP Patent Application No. 03746053.2—2416.
EP Office Action (Apr. 5, 2006) from EP Patent Application No. 03739 127.3—2416.
EP Search Report (Feb. 10, 2006) from EP Patent Application No. 03746053.2—2416.
EP Search Report (May 19, 2005) from EP Patent Application No. 03746062.3—1249.

US Office Action (Oct. 17, 2006) from U.S. Appl. No. 10/114,394.
US Office Action (Aug. 22, 2005) from U.S. Appl. No. 10/034,160.
US Final Office Action (Dec. 13, 2005) from U.S. Appl. No. 10/034,160.
U.S. Office Action (Jul. 30, 2007) from related U.S. Appl. No. 10/034,160.
US Office Action (Feb. 23, 2007) from U.S. Appl. No. 10/430,491.
US Office Action (Feb. 5, 2007) from U.S. Appl. No. 10/034,160.
US Office Action (Mar. 28, 2007) from U.S. Appl. No. 10/791,143.
US Office Action (Apr. 4, 2007) from U.S. Appl. No. 10/114,394.
US Office Action (Apr. 6, 2007) from U.S. Appl. No. 10/114,568.
US Office Action (May 22, 2006) from U.S. Appl. No. 10/114,568.
US Office Action (May 22, 2006) from U.S. Appl. No. 10/170,855.
US Office Action (May 31, 2006) from U.S. Appl. No. 10/034,160.
US Office Action (Sep. 28, 2006) from U.S. Appl. No. 10/034,160.
WO Search Report (Oct. 17, 2003) from International Patent Application No. PCT/US03/09328.
WO Search. Report (Oct. 25, 2006) from International Patent Application No. PCT/US05/37763.
WO Search Report (Nov. 4, 2003) from International Patent Application No. PCT/US03/18765.
WO Search Report (May 23, 2003) from International Patent Application No. PCT/US02/41072.
WO Search Report (Jul. 12, 2004) from Internatonal Patent Application No. PCT/US03/36452.
WO Search Report (Jul. 15, 2003) from International Patent Application No. PCT/US03/09442.
WO Written Opinion (Oct. 25, 2006) from International Patent Application No. PCT/US05/37763.
Armitage, Grenville, "MPLS: The Magic Behind the Myths," Jan. 2000, *IEEE Communications Magazine*, pp. 124-131, XP000908346.
U.S. Office Action dated Oct. 23, 2006 from related U.S. Appl. No. 10/114,568.
Brocade Communication Systems, Inc. "Optimizing the performance and management of 2Gbit/sec SAN fabrics with ISL trunking", White paper, Online', Mar. 20, 2002.
Brocade Communication Systems, Inc. "Increasing Intelligence with the SAN Fabric", White paper, Online!, Jun. 2001 XP002251362.
Molero et al., "On the effect of link failure in fibre channel sotrage area networks", Parallel Architectures, Algorithms and Networks 2000, I-Span 2000 Proceedings, Int'l Symposium, Dec. 7-9, 2000.
U.S. Office Action dated Aug. 22, 2007 from related U.S. Appl. No. 10/114,394.
Final Office Action mailed Sep. 20, 2007.
U.S. Office Action dated Mar. 28, 2007 from related U.S. Appl. No. 10/609,442.
U.S. Office Action dated Mar. 28, 2007 from related U.S. Appl. No. 10/791,143.
PCT International Search Report dated Oct. 25, 2006 from related PCT/US05/37763.
PCT Written Opinion dated Oct. 25, 2006 from related PCT/US05/37763.
PCT International Search Report dated Oct. 27, 2004 from related PCT/US2004/020518.
Ezio Valdevit, http://t11.org/index.htm, "Fabric Shortest Path First Version (FSPF) Rv. 0.2", Fabric shortest Path, May 23, 2000 XP002959525.
Claudio DeSanti, "Virtual Fabrics", T11/03-220v0, PowerPoint presentation, Apr. 2003, 11 pages.
PCT International Search Report mailed Jul. 12, 2004 from PCT Application No. PCt/US03/36452.
Claudio DeSanti, "Virtual Fabrics N_Port Support", VF $N_{13}$ Support, T11/04-49v0, Jul. 2004, 13 pages.
U.S. Office Action dated Apr. 6, 2007 from related U.S. Appl. no. 10/114,568.
Brocade Communication Systems, Inc. "Optimizing the performance and management of 2Gbit/sec SAN fabrics with ISL trunking", White paper, Online!, Mar. 2002.
Rosen et al., "Multiprotocol Label Switching Architecture", Network working group, RFC 3031, Jan. 2001 XP002251364.

VenKat Rangan: "Re: FCIP/1FCP: Gurantee In-Order delivery for FC N/NL_ports", IP Storage—Mailing List Archive, Online! http://www.pdl.cmu/edu/mailinglists/ips/mail/msg03069.html Sep. 4, 2001.

EPO Search Report dated Feb. 10, 2006, from related EP Application No. 03746053.2 -2416.

M. Rajagopal, R. et al., "IP and ARP Over Fibre Channel" Request for Comments: 2625, 'Online!, Jun. 30, 1999, XP002246207.

EP Office Action dated Apr. 5, 2006 from related EP Application No. 03 739 127.3—2416.

U.S. Office Action dated Aug. 22, 2007 from related U.S. Appl. No. 10/114,394.

EP Office Action dated Oct. 1, 2007 from related EP Application No. 03746053.2—2416.

EP Office Action dated Mar. 28, 2007 from related EP Application No. 03746053.2—2416.

U.S. Final Office Action dated Aug. 9, 2007 from related U.S. Appl. No. 10/430,491.

Australian Office Action dated May 23, 2007 from related AU Application No. 2003226093.

CA Office Action 2,487,071, dated Nov. 15, 2006.

U.S. Appl. No. 10/974,368, Office Action dated Sep. 10, 2007.

U.S. Appl. No. 11/027,252, Office Action mailed Oct. 29, 2007.

EP Office Action Application No. 03789766.7, mailed Nov. 6, 2007.

Final Office Action U.S. Appl. No. 10/609,442, mailed Sep. 5, 2007.

U.S. Appl. No. 10/114,394, Office Action mailed Feb. 6, 2008.

U.S. Appl. No. 10/114,568, Notice of Allowance mailed Mar. 26, 2008.

U.S. Appl. No. 10/114,568, Allowed claims.

U.S. Office Action U.S. Appl. No. 10/609,442, mailed Mar. 28, 2008.

China Office Action dated Jun. 22, 2007 from related China Application No. 03813264.8.

Australian Office Action dated Oct. 4, 2007 from related Australian Application No. 2003245492.

ATM Forum Committee, Chapter 10, "Flush Message Protocol Procedures and Frame Formats," Lan Emulation Over ATM Version 2—LUNI Specification, AF-Lane-0084.000, Jul. 1997, pp. 111-115.

White Paper, Link Aggregation Acoording to IEEE Standard 802. 3ad, Oct. 10, 2002, v.1.10, pp. 1-21.

Kiiskila, Marko, "Implementation of LAN Emulation of ATM in Linux," Tampereen Teknillinen Korkeakoulu, Oct. 1996, 57 pages.

IEEE Std 802.3-2002, Chapter 43.5 Marker Protocol, Part 3: Carrier Sense Multiple Access with Collision Detection (CSMA/CD) Access Method and Physical Layer Specifications, 2002, pp. 329-345.

D1: Yasumori Takizawa, "Technology Scope IP Storage Disk Divided by IP Network Wide Area Ethernet Encouraging the Same," Nikkei Communication, Mar. 4, 2000, No. 361, pp. 106-113.

D2: Glenn Sullivan, "Building of Long Distance SAN, " UNIX Magazine, Apr. 1, 2000, vol. 15, No. 4, pp. 133-137.

D4: Fujita, et al., "SSE98-225 QoS Control Using MPLS over ATM," Technical Report of IEICE, Mar. 19, 1999, vol. 98, No. 668, pp. 81-86.

Final Office Action mailed Apr. 4, 2007 from related U.S. Appl. No. 10/114,394.

Notice of Allowance for U.S. Appl. No. 10/430,491 dated Nov. 23, 2007.

Notice of Allowance for U.S. Appl. No. 10/430,491 dated Apr. 23, 2008.

Notice of Allowance for U.S. Appl. No. 10/430,491 dated Aug. 8, 2008.

Supplemental Notice of Allowance for U.S. Appl. No. 10/430,491 dated Aug. 26, 2008.

Allowed Claims for U.S. Appl. No. 10/430,491.

U.S. Final Office Action, U.S. Appl. No. 10/609,442, mailed Sep. 5, 2007.

U.S. Office Action, U.S. Appl. No. 10/609,442, mailed Mar. 28, 2008.

U.S. Appl. No. 10/974,368, Notice of Allowance dated May 1, 2008.

U.S. Appl. No. 10/979,886, Notice of Allowance dated May 13, 2008.

U.S. Appl. No. 11/027,252, Final Office Action mailed Aug. 7, 2008.

EP Office Action dated Jan. 18, 2005 from related EP Application No. 02799279.1-1525.

EP Office Action dated Oct. 18, 2005 from related EP Application No. 02799279.1-1525.

EP Office Action dated Feb. 20, 2006 for related EP Application No. 02799279-1525.

Examination Report dated Jul. 14, 2008 from Australian Patent Application No. 20032966301.

China Office Action issued Dec. 1, 2006, from related China Application No. 02828262.0.

China Office Action issued Mar. 7, 2008 from related China Application No. 03807560.1.

CN Office Action 200580034140.X, dated Jun. 6, 2008.

Japanese Application No. 2003-559086, Office Action dated May 19, 2008.

Japanese Application No. 2003-582973, Office Action dated Jun. 2, 2008.

Japanese Application No. 2003-582964, Office Action dated May 12, 2008.

U.S. Appl. No. 10/114,394, Final Office Action mailed Aug. 21, 2008.

Canadian Office Action dated Aug. 13, 2008 from related CA Application No. 2,472,056, 2 pgs.

* cited by examiner

METHODS AND APPARATUS FOR ENCAPSULATING A FRAME FOR TRANSMISSION IN A STORAGE AREA NETWORK

BACKGROUND OF THE INVENTION

1. Field of the Invention

The present invention relates to network technology. More particularly, the present invention relates to methods and apparatus for encapsulating a frame for transmission in a storage area network.

2. Description of the Related Art

When interconnecting computers and other devices in a network, it has become desirable to create "virtual local area networks" (VLANs), in which all devices coupled to a VLAN receive all frames or packets which are universally addressed (whether by broadcast, multicast, or some other technique) on that VLAN, and in which all frames or packets which are universally addressed by a device on a VLAN are not distributed to devices outside the VLAN. The VLAN approach is particularly desirable when a single physical infrastructure is to be made available to multiple parties, each requiring that its data be kept private from the other parties. Further, the VLAN approach protects network entities on a given VLAN from failures of devices on the same infrastructure but belonging to a different VLAN.

Various VLAN transport protocol technologies have been proposed and come to be accepted in the art. For example, VLAN technologies which are now common include LANE (for ATM LAN-Emulation), IEEE Standard 802.10, and various proprietary schemes such as Inter-Switch Links (ISL) (e.g., for Cisco Catalyst.TM. Inter-Switch Links).

In order to allow multiple VLANs to share a single inter-switch link on the underlying physical topology, the inter-switch link protocol (ISL) was developed at Cisco Systems. See for example U.S. Pat. No. 5,742,604, entitled "Inter-switch link mechanism for connecting high-performance network switches," Edsall, et al., issued on Apr. 21, 1998 to Cisco Systems, Inc., which is hereby incorporated by reference for all purposes. ISL provides an encapsulation mechanism for transporting packets between ports of different switches in a network on the basis of VLAN associations among those ports Although ISL supports multiple VLANs on a single underlying network topology, certain limitations have been observed. Some of these limitations prevent easy implementation of ISL on modem storage area networks (SANs).

In recent years, the capacity of storage devices has not increased as fast as the demand for storage. Therefore a given server or other host must access multiple, physically distinct storage nodes (typically disks). In order to solve these storage limitations, the storage area network was developed. Generally, a storage area network is a high-speed special-purpose network that interconnects different data storage devices and associated data hosts on behalf of a larger network of users. However, although a SAN enables a storage device to be configured for use by various network devices and/or entities within a network, data storage needs are often dynamic rather than static.

A SAN may use various types of network traffic such as Ethernet or Fibre Channel frames. Regardless of the technology used, current SAN technology requires that a single protocol (e.g., Fibre Channel) be used throughout a particular SAN. Thus, current technology fails to address the need for supporting a multiple SAN system in which different transport protocols or technologies simultaneously co-exist. Note that ISL was originally designed for encapsulation of Ethernet packets. It does not support multiple different protocols on a single physical network infrastructure.

Ethernet is currently the most widely-installed LAN technology. The most commonly installed Ethernet systems are 10BASE-T systems, which provide transmission speeds up to 10Mbps. Alternatively, fast Ethernet systems, 100BASE-T systems, provide transmission speeds up to 100 megabits per second, while Gigabit Ethernet provides support at 1000 megabits per second (or 1 billion bits per second).

While Ethernet is widely used, use of fibre channel is proliferating in systems which demand high bandwidth and low latency. More specifically, the fibre channel family of standards (developed by the American National Standards Institute (ANSI)) defines a high speed communications interface for the transfer of large amounts of data between a variety of hardware systems such as personal computers, workstations, mainframes, supercomputers, storage devices and servers that have fibre channel interfaces. Fibre channel is particularly suited for connecting computer servers to shared storage devices and for interconnecting storage controllers and drives. Moreover, fibre channel is capable of transmitting data between computer devices at a data rate of up to 1 Gbps (or 1 billion bits per second), and a data rate of 10 Gbps has been proposed by the Fibre Channel Industry Association. Accordingly, fibre channel is a technology that is in widespread use for transmitting data in SANs. However, as indicated above, ISL was not optimized for fibre channel transmissions.

In view of the above, it would be desirable if properties of a VLAN could be merged with those of a SAN to enable various storage devices to be logically assigned to various entities within a network. Moreover, it would be beneficial if a single switching mechanism could simultaneously support different transport protocols (including at least fibre channel) within a network such as a SAN.

SUMMARY OF THE INVENTION

Methods and apparatus for encapsulating a packet or frame for transmission in a storage area network are disclosed. More particularly, according to the disclosed encapsulation process, a packet or frame is encapsulated with a virtual storage area network (VSAN) identifier. Through generation and transmission of such an encapsulated packet or frame, implementation of a single VSAN as well as a network including multiple interconnected VSANs may be achieved.

In accordance with various embodiments of the present invention, an encapsulation mechanism is implemented in a virtual storage area network (VSAN). Through the concept of a VSAN, one or more network devices (e.g., servers) and one or more data storage devices are grouped into a logical network defined within a common physical infrastructure. Each VSAN is uniquely identified by a VSAN identifier.

In accordance with one aspect of the invention, a packet or frame compatible with a standard protocol employed in the storage area network is received or generated. The packet or frame is then encapsulated with a VSAN identifier. For instance, a new header (or trailer) may be appended to the packet or frame compatible with the standard protocol. Once encapsulated, the encapsulated packet or frame is sent over the storage area network. The encapsulated packet or frame is typically sent over a link such as an enhanced interswitch link shared by multiple VSANs.

In addition to the VSAN identifier, the encapsulated packet or frame may include further information. More particularly, in accordance with one embodiment, the packet or frame is also encapsulated with at least one of a Time To Live (TTL) value and/or Multi-Protocol Label Switching (MPLS) information. For instance, the TTL value may be used to specify a number of remaining hops that can be traversed before the encapsulated packet or frame is dropped. The TTL value may also be used to specify a remaining lifetime in units of time (e.g. milliseconds). MPLS is a common forwarding mechanism used in various technologies to forward packets and frames such as IP packets and Ethernet frames. However, MPLS has not been implemented or proposed for use with Fibre Channel frames.

In accordance with another embodiment, the frame is encapsulated with a type of traffic to be carried by the frame. For instance, the type of traffic to be carried by the frame may include Ethernet, Fibre Channel, and Infiniband. Typically, this "type" refers to the standard protocol employed to generate the frame in question. Through the identification of a traffic type, frames carrying a variety of traffic types may be transmitted within a VSAN. Moreover, multiple VSANs, each capable of supporting different traffic types, may be interconnected through the identification of a traffic type in the newly appended header.

Various network devices may be configured or adapted for generation of a frame compatible with a standard protocol (e.g., Fibre Channel). Similarly, a variety of network devices may be capable of receiving the frame, encapsulating the frame, and sending the encapsulated frame via a VSAN. These network devices include, but are not limited to, servers (e.g., hosts) and switches. Moreover, the functionality for the above-mentioned generation and encapsulation processes may be implemented in software as well as hardware.

Yet another aspect of the invention pertains to computer program products including machine-readable media on which are provided program instructions for implementing the methods and techniques described above, in whole or in part. Any of the methods of this invention may be represented, in whole or in part, as program instructions that can be provided on such machine-readable media. In addition, the invention pertains to various combinations and arrangements of data generated and/or used as described herein. For example, encapsulated frames having the format described herein and provided on appropriate media are part of this invention.

These and other features of the present invention will be described in more detail below in the detailed description of the invention and in conjunction with the following figures.

DETAILED DESCRIPTION OF THE PREFERRED EMBODIMENTS

Figure 1:
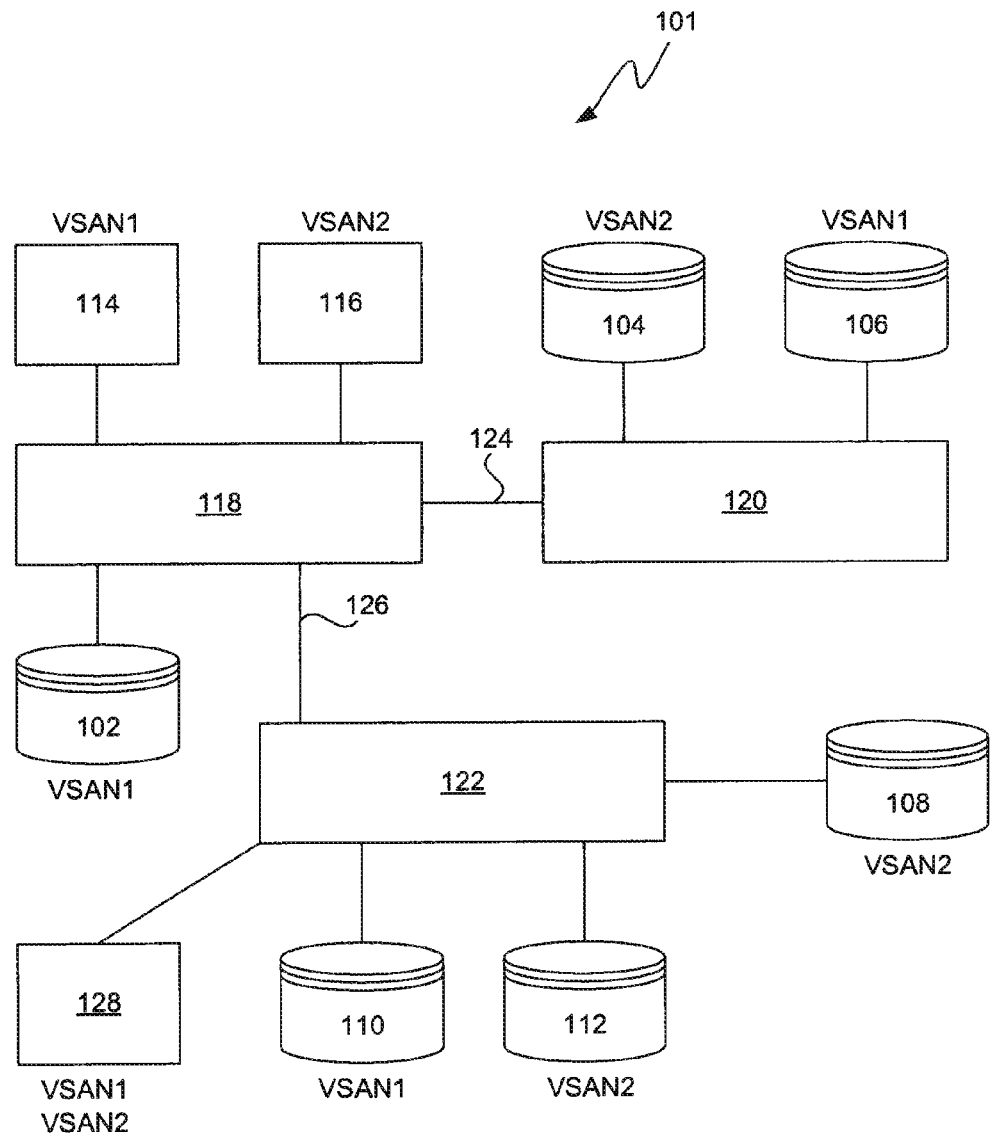
FIG. 1 is a diagram illustrating an exemplary storage area network, including multiple VSANs, in which the present invention may be implemented.

In the following description, numerous specific details are set forth in order to provide a thorough understanding of the present invention. It will be obvious, however, to one skilled in the art, that the present invention may be practiced without some or all of these specific details. In other instances, well known process steps have not been described in detail in order not to unnecessarily obscure the present invention.

As described above, a storage area network (SAN) is a network that interconnects different data storage devices with associated network hosts (e.g., data servers or end user machines) on behalf of a larger network of users. A SAN is defined by the physical configuration of the system. In other words, those devices in a SAN must be physically interconnected.

In accordance with various embodiments of the present invention, the physical SAN is shared by multiple virtual storage area networks (VSANs), each using some or all of the physical infrastructure of the SAN. An encapsulation mechanism is employed to implement the VSANs. Through the concept of a VSAN, one or more network devices (e.g., servers) and one or more data storage devices are grouped into a logical network defined within a common physical network infrastructure. Communication among these devices may be accomplished by coupling the network devices and data storage devices together through one or more switches. Exemplary data storage devices that may be used in a VSAN include, but are not limited to, storage disks in various configurations such as a redundant array interconnected disk Each VSAN is uniquely identified by a VSAN identifier rather than any particular physical configuration of devices within the network. For instance, a unique identifier may be simultaneously associated with one or more network devices as well as one or more storage devices. In general, the VSAN identifier does not represent any particular physical network device or link.

Within a VLAN infrastructure, individual VLANs are distinguished through the use of a VLAN identifier (e.g., within the range of zero through 4094). In accordance with various embodiments of the invention, individual VSANs will be distinguished within a VSAN infrastructure through the use of a VSAN identifier, as described above. It would be desirable to support mixed infrastructures containing both VLANs and VSANs, for example, using a trunk link or router able to carry traffic among VLANs and VSANs.

In accordance with one embodiment, VLAN identifiers and VSAN identifiers share the same number space. In other words, any given number can be a VSAN identifier or a VLAN identifier, but cannot be used to independently identify a VSAN and a VLAN at the same time. For example, it would not be possible to have both a VSAN #1 and VLAN #1 at the same time.

In accordance with another embodiment, VLAN identifiers and VSAN identifiers have independent number spaces. In other words, a given number can be either a VSAN identifier or a VLAN identifier, as well as an identifier for both a VSAN and a VLAN simultaneously. Since a number may correspond to either a VSAN or a VLAN, the type of network (e.g., VSAN or VLAN) is also identified. Thus, VSAN #1 and VLAN #1 can both exist at the same time as different and independent virtual networks. This type may be a separate field in the EISL header or may be incorporated into the frame type (e.g., traffic type), which will be described in further detail below with reference to FIG. 4.

FIG. 1 is a diagram illustrating an exemplary storage area network 101 in which the present invention may be implemented. As shown in FIG. 1, data storage devices 102, 104, 106, 108, 110, and 112 are coupled to hosts (e.g., servers) 114, 116, and 128 via several switches 118, 120, and 122. The switches communicate with one another via interswitch links 124 and 126. The elements described in this paragraph together comprise the physical infrastructure of SAN 101. The storage devices, switches, and hosts of SAN 101 communicate using one or more standard protocols such as fibre channel (FC), fibre channel IP (FCIP), SCSI, SCSI over IP, Ethernet, Infiniband, and the like. Sometimes, these protocols are referred to herein as "types" of traffic.

One or more VSANs may be created through logically grouping various network devices with selected data storage devices. For instance, as shown in FIG. 1, a first VSAN, VSAN1, consists of server 114, 128 and data storage devices 102, 106, 110, and 114, while a second VSAN, VSAN2, consists of server 116, 128 and data storage devices 104, 108, and 112. Note that both VSAN1 and VSAN2 share the interswitch links 124 and 126 to communicate. For example, both host 114 of VSAN1 and host 116 of VSAN2 use link 126 to access storage device 110 and storage device 112, respectively.

To ensure that network traffic crossing interswitch links 124 and 126 is properly routed to (and limited to) devices within the associated VSANs, the traffic must be identifiable as either VSAN1 traffic or VSAN2 traffic. This can be accomplished in various ways. One convenient methodology employed with this invention encapsulates data frames with some sort of VSAN identifier. That way switches 118, 120, and 122 can examine frames crossing links 124 and 126 to determine which VSAN is involved and make appropriate switching decisions based upon this information.

Various embodiments of the invention may be applied to encapsulate a packet or frame as described below with reference to FIGS. 2 through 5. The distinction between packet and frame is not universally accepted. However, one distinction that is commonly used is defined as follows. A packet is the unit of data that is routed between an origin and a destination on the Internet or any other packet-switched network. Each packet is separately numbered and includes the Internet address of the destination. In contrast, a frame is data that is transmitted between adjacent network devices. The information or data in the frame may contain packets or other data units used in a higher-level or different protocol.

For convenience, the subsequent discussion will describe encapsulated frames used to transmit data over SAN. Switches act on frames and use information about VSANs to make switching decisions. Thus, in accordance with various embodiments of the invention, frames that originate within a VSAN are constrained to stay within the physical resources allotted to that VSAN. Thus, a gateway working at a higher protocol layer (e.g., application layer 7) may pass such a packet from one VSAN to another. In order to enforce this restriction, frames may be encapsulated with a structure that identifies a VSAN to which the frames belong. Once encapsulated, the encapsulated frame is moved across network nodes; in particular over inter-switch links in the storage area network. Thus, through this encapsulation, a single link may transport frames associated with multiple VSANs. An exemplary encapsulated packet will be described in farther detail below with reference to FIG. 3 and FIG. 4.

Note that the frames being encapsulated possess the frame format specified for a standard protocol such as Ethernet or fibre channel. Hence, software and hardware conventionally used to generate such frames may be employed with this invention. Additional hardware and/or software is employed to encapsulate the standard frames in accordance with this invention. Those of skill in the art will understand how to develop the necessary hardware and software to allow encapsulation of the type described below.

In accordance with the present invention, a frame compatible with a standard protocol employed in a storage area network is obtained at a node where encapsulation subsequently takes place. The frame is generated by a network device such as a host, switch, or storage device. In a typical scenario, the host machine generates the frame in accordance with a standard protocol such as fibre channel and forwards the frame to a switch. The switch then performs an encapsulation process such as that described below. In some embodiments, the host or storage device may itself perform the encapsulation described herein.

In still other embodiments, the switch may receive a data stream and first frame it in accordance with a standard protocol and then encapsulate the resulting frame to produce the new frames of this invention. The resulting encapsulated frame is sometimes referred to herein an "extended ISL" (EISL) frame because of its general relationship with the interswitch link protocol described in U.S. Pat. No. 5,742,604, previously incorporated by reference.

As just explained, the encapsulation process may be performed by a network device outside the switch (e.g., by a host) as well as within a switch. Obviously, the appropriate network devices should be configured with the appropriate software and/or hardware for performing EISL encapsulation. Of course, all network devices within the storage area network need not be configured with EISL encapsulation software (or hardware). Rather, selected network devices may be configured with or adapted for EISL encapsulation functionality. Similarly, in various embodiments, such EISL encapsulation functionality may be enabled or disabled through the selection of various modes. Moreover, it may be desirable to configure selected ports of network devices as EISL-capable ports capable of performing EISL encapsulation, either continuously, or only when in an EISL enabled state.

The standard protocol (e.g., layer 2 protocol) employed in the storage area network (i.e., the protocol used to frame the data) will typically, although not necessarily, be synonymous with the "type of traffic" carried by the network. As explained below, the type of traffic is defined in some encapsulation formats. Examples of the type of traffic are typically layer 2 or corresponding layer formats such as Ethernet and Fibre Channel.

Another type of traffic that may be used within a VSAN is an InfiniBand architecture, which is a relatively recent input/output (I/O) specification for servers. More particularly, connections between servers, remote storage and networking are accomplished by attaching all devices through a central, unified, fabric of InfiniBand switches and links. Stated benefits of the InfiniBand architecture include lower latency, easier and faster sharing of data, and built in security and quality of service. The InfiniBand architecture is a rapidly developing technology for server clusters as well as I/O for remote storage and networking. Thus, the InfiniBand Architecture is well suited to address the demands generated by the rapid growth of the Internet and the convergence of data and telecommunications (voice, data, video, and storage) on the Internet. With InfiniBand, data is transmitted in one or more packets that together form a message. For instance, a message can be a remote direct memory access (RDMA) read or write operation, a channel send or receive message, a transaction-based operation (that can be reversed), or a multicast transmission.

In addition, other types of traffic may include token ring, token bus, and various protocols compatible with satellite systems such as Aloha. It is also important to note that the type of traffic should also be supported by the technology used in the storage area network. For instance, the technology used in the hosts and/or switches (e.g., interface port circuitry) as well as the communication mediums should support the traffic type being carried in the encapsulated frame.

Figure 2:
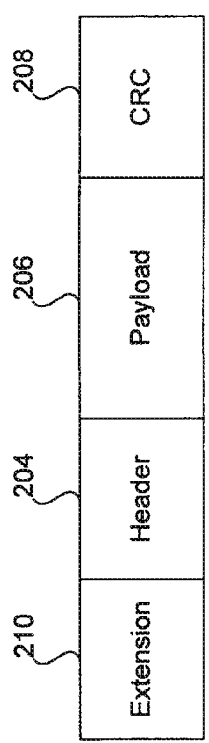
FIG. 2 is a diagram illustrating an "extension" to a frame such as a fibre channel in accordance with one embodiment of the invention.

As shown in FIG. 2, a frame compatible with a standard protocol employed in a storage area network is obtained. For instance, a frame such as a fibre channel frame 202 typically includes a header 204, payload 206 and error check information such as a cyclic redundancy checking (CRC) value 208. Cyclic redundancy checking is a method of checking a received frame for errors in data that has been transmitted on a communications link. As described above, it is necessary to identify the VSAN associated with the frame 202. However, pursuant to the standard governing fibre channel, the header 204 of a fibre channel frame 202 does not include unused bits to enable additional fields to be defined. As a result, an "extension" 210 to the frame 202 is required. Extension 210 may assume various formats. Importantly, it should include at least information identifying the VSAN and other information specifying one or more of the following: type of traffic, MPLS information, and time to live.

Figure 3:
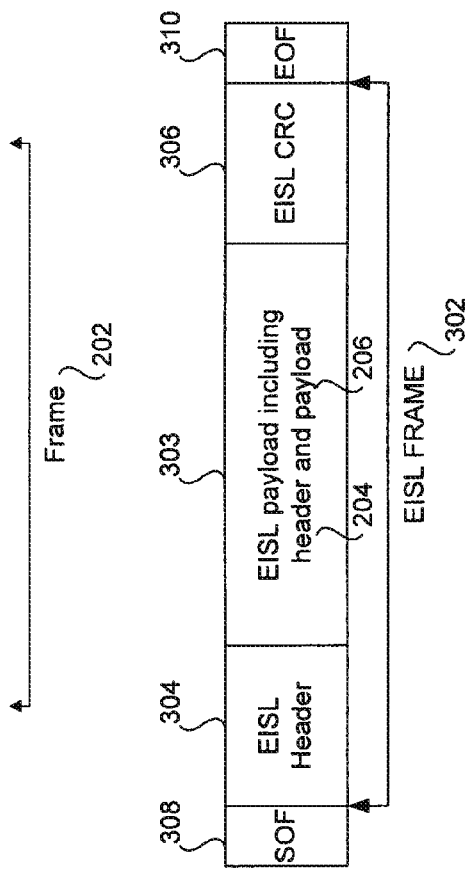
FIG. 3 is a diagram illustrating an extended ISL (EISL) frame format including an EISL header in accordance with one embodiment of the invention.

In accordance with various embodiments, as shown in FIG. 3, a new frame 302 having an extended ISL (EISL) format is generated from information obtained from the original frame 202. More particularly, encapsulation may include the appending of a new header (or trailer) to the original frame 202. For instance, as shown, the new frame 302 includes a payload 303 that preferably includes both the header 204 and payload 206 of the original frame, and a new EISL header 304. In addition, the payload 303 may also include the CRC 208 of the original frame. Encapsulation may also comprise the modification or replacement of the original CRC value 208 with a new (e.g., additional) or modified CRC value 306. More particularly, since the new frame is longer than the original frame 202, a new CRC value 306 may be generated (e.g., calculated) to correspond the longer length of the frame 302 that includes the newly appended EISL header 304 and its associated length. This new CRC 306 may therefore replace the original CRC 208. In this manner, a new frame is generated by encapsulating the frame with an EISL header.

In accordance with various embodiments, an EISL frame 302 such as that illustrated in FIG. 3 is preceded by a start of frame (SOF) delimiter 308 and terminated by an end of frame (EOF) delimiter 310. These delimiters enable an EISL-capable port to receive and recognize frames in EISL format. However, if an EISL-capable port is not in EISL mode or, alternatively, the port is not EISL-capable and it receives frames in the EISL format, it can drop the frame.

Figure 4:
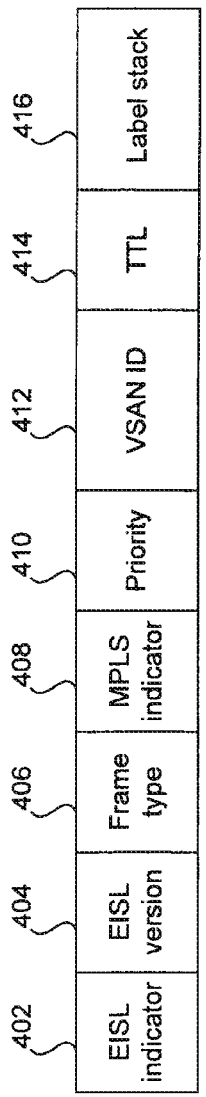
FIG. 4 is a diagram illustrating an exemplary EISL header (and associated MPLS label stack) that may be transmitted in a frame having an EISL frame format such as that illustrated in FIG. 3.

FIG. 4 is a diagram illustrating an exemplary EISL header of a frame that has an overall EISL frame format such as that illustrated in FIG. 3. More particularly, as described above, the EISL header preferably identifies a VSAN. In addition, encapsulation may include providing further information in the encapsulated frame. As will be described in further detail below, the EISL header may supply further information in various fields of the EISL header. More particularly, an EISL indicator field 402 may be used to indicate the presence of an EISL header. In addition, an EISL version indicator field 404 may indicate a version of EISL used to create the frame. In a specific example, the EISL version indicator field 404 of the EISL header includes at least 2 bits.

The EISL header further includes a field indicating a frame type 406 (i.e., traffic type). The type of traffic (e.g., payload) to be carried by the frame may include a variety of traffic types such as those described above, including but not limited to, Ethernet, fibre channel, and Infiniband. In one embodiment, the frame type field 406 is a 4-bit field. Through the identification of a traffic type, EISL formatted frames carrying a variety of traffic types may be transmitted within a VSAN. Moreover, multiple VSANs, each capable of supporting different traffic types, may be interconnected through the identification of a traffic type in the newly appended EISL header.

Multi-Protocol Label Switching (MPLS) label field (e.g., Indicator) 408 indicates whether the EISL header is carrying MPLS information such as an MPLS label stack, a common forwarding mechanism for both fibre channel and Ethernet frames. An exemplary MPLS label stack will be described in further detail below with reference to FIG. 5. In one embodiment, the MPLS label field 408 is a 1-bit field. More particularly, the MPLS label field 408 indicates whether or not MPLS labels are provided in the EISL frame. For instance, the indicator may be set to 1 if the EISL header includes an MPLS label stack and otherwise be set to 0. The MPLS label field 408 may also indicate the number of labels present in 416.

Priority field 410 may indicate a user priority for the EISL frame. The user priority may represent various types of priorities. As one example, the user priority may be a generic priority, without a guaranteed level of service, that is used to merely indicate a priority such as a numerical ranking. For instance, higher values simply represent higher user priority while lower values may represent lower priority. Higher priority users receive available bandwidth first, regardless of how much total bandwidth is available. The number of bits used for this field will vary with the number of priority levels or values implemented.

As another example, the user priority may indicate a quality of service (QoS) of the payload of the EISL frame. On the Internet and in other networks, QoS is the idea that transmission rates, error rates, and other characteristics can be measured, improved, and, to some extent, guaranteed in advance. QoS is of particular concern for the continuous transmission of high-bandwidth video and multimedia information. Transmitting this kind of content dependably is difficult in public networks using ordinary "best effort" protocols. Typically, the number of bits required for a priority field are greater to specify the quality of service than a simple numerical priority. In one embodiment, the priority field 410 is a 3-bit field.

As described above, the EISL header, at a minimum, includes a VSAN identifier field 412 adapted for including a VSAN identifier that identifies one or more VSANs. More particularly, in accordance with one embodiment, the VSAN identifier identifies a VSAN associated with the payload of the EISL frame, and therefore the payload of the original frame (e.g., Fibre Channel frame). In accordance with one embodiment, the VSAN identifier field 412 is a 12-bit field. The format of the identifier may be identical to or similar to VLAN identifiers as well as similar to addresses employed in certain standard protocols such as Ethernet.

In some storage area networks, there may be topology as well as routing problems that could cause a frame to traverse a loop within the network. Such a loop will consume bandwidth unnecessarily. In order to solve this problem, a Time To Live (TTL) field 414 may be used to indicate a TTL value specifying the number of remaining hops that can be traversed before the frame is dropped. More specifically, the TTL value of the TTL field 414 is initialized by the network device (e.g., switch) that generates the EISL frame including the EISL header. A default value may, for example, be set to 16. Subsequent network devices (e.g., switches) receiving the EISL frame decrement the TTL value of the TTL field 414 by 1.

In accordance with one embodiment, a TTL value of 1 indicates to the receiving network device (e.g., switch) that the EISL frame should be dropped. When the EISL frame is dropped, an error message may be sent to the intended recipient of the frame as well as to the sender of the frame. Similarly, a TTL value of 0 may indicate that the TTL field 414 should be ignored, allowing the EISL frame to be forwarded by the switch. In accordance with one embodiment, the TTL field 414 is an 8-bit field.

As described above, an MPLS indicator 408 may be used to indicate whether the EISL header is carrying MPLS information such as an MPLS label stack 416. As a packet of a connectionless network layer protocol travels from one router to the next, each router makes an independent forwarding decision for that packet. That is, each router analyzes the packet's header, and each router runs a network layer routing algorithm. Each router independently chooses a next hop for the packet, based on its analysis of the packet's header and the results of running the routing algorithm.

Packet headers contain considerably more information than is needed simply to choose the next hop. Choosing the next hop can therefore be thought of as the composition of two functions. The first function partitions the entire set of possible packets into a set of "Forwarding Equivalence Classes (FECs)." The second function maps each FEC to a next hop. Insofar as the forwarding decision is concerned, different packets which get mapped into the same FEC are indistinguishable. All packets which belong to a particular FEC and which travel from a particular node will follow the same path (or if certain kinds of multi-path routing are in use, they will all follow one of a set of paths associated with the FEC).

In conventional IP forwarding, a particular router will typically consider two packets to be in the same FEC if there is some address prefix X in that router's routing tables such that X is the "longest match" for each packet's destination address. As the packet traverses the network, each hop in turn reexamines the packet and assigns it to a FEC. In MPLS, the assignment of a particular packet to a particular FEC is done just once, as the packet enters the network. The FEC to which the packet is assigned is encoded as a short fixed length value known as a "label."

When a packet is forwarded to its next hop, the label is sent along with it; that is, the packets are "labeled" before they are forwarded. At subsequent hops, there is no further analysis of the packet's network layer header. Rather, the label is used as an index into a table which specifies the next hop and a new label. The old label is replaced with the new label, and the packet is forwarded to its next hop. In the MPLS forwarding paradigm, once a packet is assigned to a FEC, no further header analysis is done by subsequent routers; all forwarding is driven by the labels. This has a number of advantages over conventional network layer forwarding. For instance, through MPLS labels, it is possible to circumvent conventional IP routing. Further details of the MPLS forwarding mechanism and MPLS label stack encoding are disclosed in RFC 3031, Multiprotocol Label Switching Architecture, Rosen et al., January 2001 and RFC 3032, MPLS Label Stack Encoding, Rosen et al., January 2001, respectively, and are incorporated by reference for all purposes.

As described above with reference to block 408 of FIG. 4, an indicator may be used to indicate whether the EISL frame includes a label stack. In accordance with one embodiment, a label stack may include a maximum of 4 labels. Each label in the label stack has an identical label format.

Figure 5:
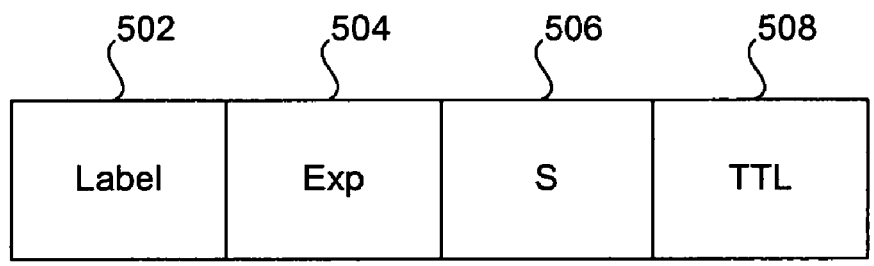
FIG. 5 is a diagram illustrating an exemplary MPLS label format that may be used for each label in the MPLS label stack of FIG. 4 in accordance with one embodiment of the invention.

FIG. 5 is a diagram illustrating an exemplary MPLS label format that may be used for each label in the MPLS label stack of FIG. 4 in accordance with one embodiment of the invention. Label field 502 carries the actual value of the corresponding label used to make forwarding decisions. When a labeled packet is received, the label value at the top of the stack is looked up. As a result of a successful lookup in a corresponding table, file or database, the following information is ascertained: a) the next hop to which the packet is to be forwarded, and b) the operation to be performed on the label stack before forwarding; this operation may be to replace the top label stack entry with another, to pop an entry off the label stack, or to replace the top label stack entry and then to push one or more additional entries on the label stack. In addition to learning the next hop and the label stack operation, one may also learn the outgoing data link encapsulation, and possibly other information which is needed in order to properly forward the packet. In accordance with one embodiment, the label field 502 is a 32-bit field.

Experimental field 504 may be reserved for experimental use. The experimental field 504 is typically used to encode the Differentiated Service Code Point (DSCP), which is a mechanism for Quality of Service.

In addition, a termination field 506 may be provided in the label to indicate if this label is the last label in the stack. In accordance with one embodiment, the termination field is a single bit indicator. For instance, the termination field 506 may indicate that the label is the last label in the label stack when the indicator is in a first state (e.g., 1) and that the label is not the last label in the label stack when the indicator is in a second state (e.g., 0).

The label may also include a TTL field 508. The TTL field 508 is typically used to provide TTL field semantics associated with IPv4 packets or Hop Count semantics associated with IPv6 packets.

Figure 6:
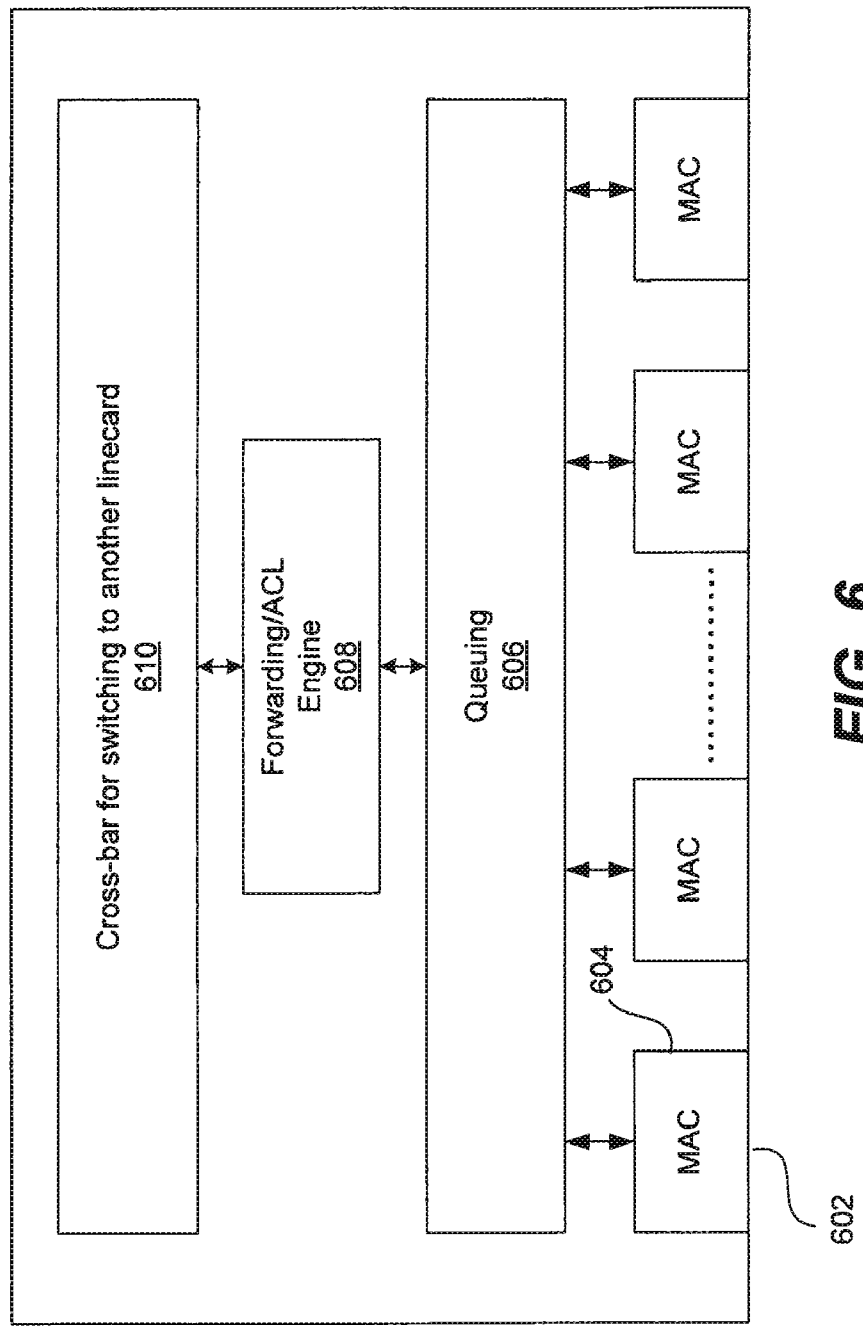
FIG. 6 is a diagram illustrating an exemplary network device in which embodiments of the invention maybe implemented.

As described above, encapsulation may be performed in a variety of network devices. FIG. 6 is a diagram illustrating an exemplary network device in which embodiments of the invention may be implemented. The network device illustrated is a hybrid switch that can switch both Ethernet and fibre channel frames. It is preferred that frames of various types (e.g., Ethernet and fibre channel) be transported via a single switching mechanism. Through the use of an extended ISL (EISL) frame format, frames of different types may be transported using the same switch or ISL, rather than dedicating a switch or ISL to different frame (or traffic) types.

As shown in FIG. 6, data is received by a port 602 of the switch via a bi-directional connector (not shown). In association with the incoming port, Media Access Control (MAC) block 604 is provided, which enables frames of various protocols such as Ethernet or fibre channel to be received. Once a frame is encapsulated as described above, it is then received by a forwarding engine 608, which obtains information from various fields of the frame, such as source address and destination address. The forwarding engine 608 then accesses a forwarding table (not shown) to determine whether the source address has access to the specified destination address. The forwarding engine 608 also determines the appropriate port of the switch via which to send the frame, and generates an appropriate routing tag for the frame.

Once the frame is appropriately formatted for transmission, the frame will be received by a buffer queuing block 606 prior to transmission. Rather than transmitting frames as they are received, it may be desirable to temporarily store the frame in a buffer or queue 606. For instance, it may be desirable to temporarily store a packet based upon Quality of Service in one of a set of queues that each correspond to different priority levels. The frame is then transmitted via switch fabric 610 to the appropriate port. Each outgoing port also has its own MAC block and bi-directional connector via which the frame may be transmitted.

Although the network device described above with reference to FIG. 6 is described as a switch, this network device is merely illustrative. Thus, other network devices such as routers may be implemented to receive, process, modify and/or generate packets or frames with functionality such as that described above for transmission in a storage area network. Moreover, the above-described network devices are merely illustrative, and therefore other types of network devices may be implemented to perform the disclosed encapsulation functionality.

Once the EISL frame is generated, the encapsulated frame may be sent by the switch over an inter-switch (ISL) link configured to couple source and destination port interface circuitry in a sequential arrangement of interconnected switches as illustrated in FIG. 1. The ISL link may consist of any type of media (e.g., twisted-pair or fiber) capable of functioning as an extension to a switching bus or other communication medium. Moreover, port interface circuitry may comprise encapsulation as well as decapsulation circuits. Since the interface to the ISL essentially comprises the port interface circuitry, any number of ports of a network device such as the switch illustrated in FIG. 6 are capable of being configured as EISL ports. That is, the ISL port interface circuit may include a circuit and/or otherwise be configured with software that includes functionality for encapsulating packets according to the disclosed EISL encapuslation mechanism, as well as decapsulating packets.

Although illustrative embodiments and applications of this invention are shown and described herein, many variations and modifications are possible which remain within the concept, scope, and spirit of the invention, and these variations would become clear to those of ordinary skill in the art after perusal of this application. For instance, the present invention is described as being implemented using a specific EISL header. However, it should be understood that the invention is not limited to such implementations, but instead would equally apply regardless of the fields defined in such a header. Moreover, the present invention would apply regardless of the context and system in which it is implemented. Thus, broadly speaking, the operations described above need not be used within a SAN, but may be used to enable protocol compatibility within any network.

In addition, although an exemplary switch is described, the above-described embodiments may be implemented in a variety of network devices (e.g., servers) as well as in a variety of mediums. For instance, instructions and data for implementing the above-described invention may be stored on a disk drive, a hard drive, a floppy disk, a server computer, or a remotely networked computer. Accordingly, the present embodiments are to be considered as illustrative and not restrictive, and the invention is not to be limited to the details given herein, but may be modified within the scope and equivalents of the appended claims.

What is claimed is:

1. A method implemented on a network device for use in a storage area network, the method comprising:

receiving or generating a packet or frame compatible with a standard protocol employed in the storage area network, the packet or frame including a first header;

encapsulating the packet or frame with a virtual storage area network identifier, a type of traffic to be carried by the packet or frame, and information specifying at least one of a TTL value or MPLS information, wherein encapsulating comprises appending a second header to the packet or frame to create a new packet or frame, wherein the second header includes fields for the virtual storage area network identifier and information specifying at least one of the TTL value or the MPLS information, wherein the second header further includes a field specifying the type of traffic to be carried by the packet or frame, wherein the type of traffic to be carried by the packet or frame is one of two or more available types of traffic, wherein the two or more available types of traffic include at least one of Ethernet, fibre channel, or Infiniband; and sending the encapsulated packet or frame.

2. The method of claim 1, wherein the network device is a switch and wherein sending the encapsulated packet or frame comprises sending the encapsulated packet or frame over an inter-switch link in the storage area network.

3. The method as recited in claim 1, wherein the TTL value specifies a number of remaining hops that can be traversed before the encapsulated packet or frame is dropped.

4. The method as recited in claim 1, wherein the TTL value specifies a remaining lifetime.

5. The method of claim 1, further comprising calculating an error check value for the new packet or frame and including the error check value in the new packet or frame.

6. The method of claim 1, wherein the second header includes a first field for the TTL value and a second field for the MPLS information.

7. The method of claim 1, wherein the type of traffic to be carried by the packet or frame specifies the standard protocol of the packet or frame.

8. The method of claim 1, wherein the second header includes four bits for the field specifying a type of traffic to be carried by the packet or frame.

9. The method of claim 1, wherein the second header further comprises a field specifying a user priority for the packet or frame.

10. The method of claim 1, wherein the standard protocol is Fibre Channel.

11. The method of claim 1, wherein the standard protocol is Ethernet.

12. The method of claim 1, wherein the standard protocol is Infiniband.

13. The method of claim 1, wherein the header field for the virtual storage area network identifier has 12 bits reserved.

14. The method of claim 1, wherein the second header includes a TTL field and the field has 8 bits reserved.

15. The method of claim 1, wherein the second header includes an indicator field to indicate whether one or more MPLS labels are present.

16. The method of claim 1, wherein the second header includes an indicator field to indicate a number of MPLS labels present in the new packet or frame.

17. The method of claim 1, wherein the new packet or frame includes one or more MPLS labels, each of the labels including an indicator to indicate whether the label is the last label in a label stack.

18. The method of claim 15, wherein the indicator field is one bit.

19. The method of claim 1, wherein the second header further includes a version field indicating a version of the second header.

20. A computer-readable medium storing thereon computer-readable instructions that, when executed by a computer, cause the computer to perform a method on a network device in a storage area network, comprising:
instructions for receiving or generating a packet or frame compatible with a standard protocol employed in the storage area network, the packet or frame including a first header;
instructions for encapsulating the packet or frame with a virtual storage area network identifier, a type of traffic to be carried by the packet or frame, and information specifying at least one of a TTL value or MPLS information, wherein the instructions for encapsulating comprise instructions for appending a second header to the packet or frame to create a new packet or frame, wherein the second header includes fields for the virtual storage area network identifier and information specifying at least one of the TTL value or the MPLS information, wherein the second header further includes a field specifying the type of traffic to be carried by the packet or frame, wherein the type of traffic to be carried by the packet or frame is one of two or more available types of traffic, wherein the two or more available types of traffic include at least one of Ethernet, fibre channel, or Infiniband; and
instructions for sending the encapsulated packet or frame.

21. The computer-readable medium of claim 20, wherein the network device is a switch and wherein the instructions for sending the encapsulated packet or frame comprise instructions for sending the encapsulated packet or frame over an inter-switch link in the storage area network.

22. The computer-readable medium as recited in claim 20, wherein the TTL value specifies a number of remaining hops that can be traversed before the encapsulated packet or frame is dropped.

23. The method as recited in claim 20, wherein the TTL value specifies a remaining lifetime.

24. The computer-readable medium of claim 20, further comprising instructions for calculating an error check value for the new packet or frame and including the error check value in the new packet or frame.

25. The computer-readable medium of claim 20, wherein the second header includes a first field for the TTL value and a second field for the MPLS information.

26. The computer-readable medium of claim 20, wherein the type of traffic to be carried by the packet or frame specifies the standard protocol of the packet or frame.

27. The computer-readable medium of claim 20, wherein the second header includes four bits for the field specifying a type of traffic to be carried by the packet or frame.

28. The computer-readable medium of claim 20, wherein the second header further comprises a field specifying a user priority for the packet or frame.

29. The computer-readable medium of claim 20, wherein the standard protocol is Fibre Channel.

30. The computer-readable medium of claim 20, wherein the standard protocol is Ethernet.

31. The computer-readable medium of claim 20, wherein the standard protocol is Infiniband.

32. The computer-readable medium of claim 20, wherein the header field for the virtual storage area network identifier has 12 bits reserved.

33. The computer-readable medium of claim 20, wherein the second header includes a TTL field and the field has 8 bits reserved.

34. The computer-readable medium of claim 20, wherein the second header includes an indicator field to indicate whether one or more MPLS labels are present.

35. The computer-readable medium of claim 20, wherein the new packet or frame includes one or more MPLS labels, each of the labels including an indicator to indicate whether the label is the last label in a label stack.

36. The method of claim 20, wherein the second header includes an indicator field to indicate a number of MPLS labels present in the new packet or frame.

37. The computer-readable medium of claim 34, wherein the indicator field is one bit.

38. The computer-readable medium of claim 20, wherein the second header further includes an indicator field to indicate whether the second header is present.

39. The computer-readable medium of claim 20, wherein the second header further includes a version field indicating a version of the second header.

40. A network device for use in a storage area network, the network device comprising:
a plurality of ports each configured to transmit and/or receive packets or frames compatible with one or more standard protocols employed in the storage area network; and
a processor and associated instructions that can encapsulate packets or frames of at least one of the standard protocols to include a virtual storage area network identifier, a type of traffic to be carried by the packet or frame, and information specifying at least one of a TTL value or MPLS information and deliver the resulting encapsulated packets or frames for transmission over the storage area network, the packet or frame including a first header, wherein the processor and associated instructions are configured to append a second header to the packet or frame to create a new packet or frame, wherein the second header includes fields for the virtual storage area network identifier and the information specifying at least one of the TTL value or the MPLS information, wherein the second header further includes a field specifying the type of traffic to be carried by the packet or frame, wherein the type of traffic to be carried by the packet or frame is one of two or more available types of traffic, wherein the two or more available types of traffic include at least one of Ethernet, fibre channel, or Infiniband.

41. A network device for use in a storage area network, the network device comprising:
means for transmitting and/or receive packets or frames compatible with one or more standard protocols employed in the storage area network; and
means for encapsulating packets or frames of at least one of the standard protocols to include a virtual storage area network identifier, a type of traffic to be carried by the packet or frame, and information specifying at least one of a TTL value or MPLS information, the packet or frame including a first header, wherein the means for encapsulating includes means for appending a second header to the packet or frame to create a new packet or frame, wherein the second header includes fields for the virtual storage area network identifier and the information specifying at least one of the TTL value or the MPLS information, wherein the second header further includes a field specifying a type of traffic to be carried by the packet or frame, wherein the type of traffic to be carried by the packet or frame is one of two or more available types of traffic, wherein the two or more available types of traffic include at least one of Ethernet, fibre channel, or Infiniband; and means for delivering the resulting encapsulated packet or frames for transmission over the storage area network.

42. A switch for use in a storage area network, the switch comprising:

a plurality of ports each configured to transmit and/or receive packets or frames compatible with one or more standard protocols employed in the storage area network, where at least one of the ports supports an inter-switch link with another switch on a storage area network, wherein the packets or frames compatible with one or more standard protocols employed in the storage area network include a first header; and a processor and associated instructions that can encapsulate packets or frames of at least one of the standard protocols to include a virtual storage area network identifier, a type of traffic to be carried by the packet or frame, and information specifying at least one of a TTL value or MPLS information and deliver the resulting encapsulated packets or frames for transmission from the port supporting the inter-switch link, wherein the processor can encapsulate said packets or frames by adding a second header to the packets or frames to create new packets or frames, wherein the second header includes fields for the virtual storage area network identifier and information specifying at least one of the TTL value or the MPLS information, wherein the second header further includes a field specifying a type of traffic to be carried by the packet or frame, wherein the type of traffic to be carried by the packet or frame is one of two or more available types of traffic, wherein the two or more available types of traffic include at least one of Ethernet, fibre channel, or Infiniband.

43. The switch of claim 42, wherein the port supporting an inter-switch link provides fibre channel packets or frames.

44. The switch of claim 42, wherein the port supporting an inter-switch link provides Ethernet packets or frames.

45. The switch of claim 42, wherein the port supporting an inter-switch link provides Infiniband packets or frames.

46. The switch of claim 42, further comprising a plurality of line cards, each providing at least one of the plurality of ports.

47. The switch of claim 42, wherein the processor can calculate an error check value for the new packet or frame and include the error check value in the new packet or frame.

48. The switch of claim 42, wherein the second header includes a first field for the TTL value and a second field for the MPLS information.

49. A method implemented on a network device for use in a storage area network, the method comprising:

receiving or generating a packet or frame compatible with a standard protocol employed in the storage area network, the packet or frame including a first header;

encapsulating the packet or frame with a virtual storage area network identifier and information specifying a type of traffic to be carried by the packet or frame, wherein the type of traffic to be carried by the packet or frame is one of two or more available types of traffic, wherein the two or more available types of traffic include at least one of Ethernet, fibre channel, or Infiniband, wherein encapsulating comprises adding a second header to the packet or frame to create a new packet or frame, wherein the second header includes fields for the virtual storage area network identifier and the information specifying the type of traffic to be carried by the packet or frame; and sending the encapsulated packet or frame.

50. The method of claim 49, wherein the network device is a switch and wherein sending the encapsulated packet or frame comprises sending the encapsulated packet or frame over an inter-switch link in the storage area network.

51. The method of claim 49, wherein the second header further includes a first field for the TTL value and a second field for the MPLS information.

52. The method of claim 49, wherein the type of traffic to be carried by the packet or frame specifies the standard protocol of the packet or frame.

53. A computer-readable medium storing thereon computer-readable instructions that, when executed by a computer, causes the computer to perform a method on a network device in a storage area network, comprising:

instructions for receiving or generating a packet or frame compatible with a standard protocol employed in the storage area network, the packet or frame including a first header;

instructions for encapsulating the packet or frame with a virtual storage area network identifier and information specifying a type of traffic to be carried by the packet or frame, wherein the type of traffic to be carried by the packet or frame is one of two or more available types of traffic, wherein the two or more available types of traffic include at least one of Ethernet, fibre channel, or Infiniband, wherein the instructions for encapsulating comprise instructions for adding a second header to the packet or frame to create a new packet or frame, wherein the second header includes fields for the virtual storage area network identifier and the type of traffic to be carried by the packet or frame; and instructions for sending the encapsulated packet or frame.

54. The computer-readable medium of claim 53, wherein the network device is a switch and wherein sending the encapsulated packet or frame comprises sending the encapsulated packet or frame over an inter-switch link in the storage area network.

55. The computer-readable medium of claim 53, wherein the second header further includes a first field for the TTL value and a second field for the MPLS information.

56. The computer-readable medium of claim 53, wherein the type of traffic to be carried by the packet or frame specifies the standard protocol of the packet or frame.

57. A method implemented on a switch for use in a fibre channel network, the method comprising:

receiving or generating a fibre channel packet or frame, the fibre channel packet or frame including a first header;

encapsulating said fibre channel packet or frame with a TTL value, wherein encapsulating comprises adding a second header to the packet or frame to create a new packet or frame, wherein the second header includes a field for the TTL value a virtual storage area network identifier, and a type of traffic to be carried by the packet or frame, wherein the second header further includes a field specifying the type of traffic to be carried by the packet or frame, wherein the type of traffic to be carried by the packet or frame is one of two or more available types of traffic, wherein the two or more available types of traffic include at least one of Ethernet, fibre channel, or Infiniband; and sending the encapsulated packet or frame over an inter-switch link in the fibre channel network.

58. A computer-readable medium storing thereon computer-readable instructions that, when executed by a computer, cause the computer to perform a method on a switch for use in a fibre channel network, comprising:
  instructions for receiving or generating a fibre channel packet or frame, the fibre channel packet or frame including a first header;
  instructions for encapsulating said fibre channel packet or frame, wherein encapsulating comprises adding a second header to the packet or frame to create a new packet or frame, wherein the second header includes a virtual storage area network identifier, a field for the TTL value, and a field specifying a type of traffic to be carried by the packet or frame, wherein the type of traffic to be carried by the packet or frame is one of two or more available types of traffic, wherein the two or more available types of traffic include at least one of Ethernet, fibre channel, or Infiniband; and
  instructions for sending the encapsulated packet or frame over an inter-switch link in the fibre channel network.

* * * * *

UNITED STATES PATENT AND TRADEMARK OFFICE
CERTIFICATE OF CORRECTION

PATENT NO. : 7,599,360 B2  Page 1 of 1
APPLICATION NO. : 10/034160
DATED : October 6, 2009
INVENTOR(S) : Edsall et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 971 days.

Signed and Sealed this

Twenty-eighth Day of September, 2010

David J. Kappos
*Director of the United States Patent and Trademark Office*